United States Patent [19]

Boogay

[11] 4,299,699
[45] Nov. 10, 1981

[54] BACKWASHABLE HELICAL-MEDIA COALESCER

[76] Inventor: Marc A. Boogay, 1897 Arroyo Ave., Oceanside, Calif. 92045

[21] Appl. No.: 195,893

[22] Filed: Oct. 14, 1980

[51] Int. Cl.³ .............................................. B01D 29/14
[52] U.S. Cl. ..................................... 210/143; 210/317; 210/411; 210/484; 210/497.01; 210/DIG. 5
[58] Field of Search ............... 210/108, 143, 168, 299, 210/315, 317, 407, 411, 437, 441, 442, 446, 448, 451–454, 457, 484, 487, 497.01, DIG. 5

[56] References Cited

U.S. PATENT DOCUMENTS

| | | | |
|---|---|---|---|
| 3,415,384 | 12/1968 | Kasten | 210/484 |
| 3,868,325 | 2/1975 | Otto | 210/437 X |
| 3,931,019 | 1/1976 | Fowler | 210/DIG. 5 |
| 3,966,603 | 6/1976 | Grant | 210/DIG. 5 |
| 4,048,071 | 9/1977 | Yamada et al. | 210/317 X |
| 4,102,785 | 7/1978 | Head et al. | 210/484 X |
| 4,219,420 | 8/1980 | Müller | 210/446 X |

Primary Examiner—Thomas G. Wyse
Attorney, Agent, or Firm—Richard S. Sciascia; Joseph M. St.Amand

[57] ABSTRACT

A coalescing/filtration media composed of yarn-like material held together during normal operation but loosened during backwash to allow "strumming" or vibrating to help loosen media-clogging material, and an armature arrangement by which a cylindrical assembly of yarn segments can be tightened in a helical fashion to perform as filtration/coalescing media or, during backwash, can be loosened to promote the dislodging of clogging material.

13 Claims, 5 Drawing Figures

BACKWASHABLE HELICAL-MEDIA COALESCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is related to coalescing and filtration devices and particularly for a unique means for cleaning and renewing the coalescing media.

Coalescers are employed for separation of liquid-in-liquid suspensions. Examples include the coalescing out of water suspended in fuel or of oils suspended in wastewater. Theoretically, coalescers can operate with infinite lifespans when separating clean, clear liquids only. In actual use, however, solid particles are involved which interfere with coalescer operation by clogging pores in the coalescing media. These clogged pores increase the pressure required to maintain a given flow-rate. Typically, coalescers are subjected to particulates to a great extent incurring very high operating and maintenance costs for the purchase and installation of replacement coalescing media cartridges.

SUMMARY OF THE INVENTION

The present invention operates to coalesce liquid-in-liquid suspensions with the ability to remove particulate matter when necessary. The device uses a twisting action to tighten or loosen coalescer media composed of yarn-like material to allow for effective backwashing and removal of clogging solids. The yarn-like material is wound about a perforated armature or spool with a moveable endplate for controlling torsion in the yarn. The yarn is effective as a coalescing media when twisted tightly against the armature but may be backwashed and cleaned when loosened. The arrangement for tightening or loosening the yarn-like material helically about the perforated spool allows for varying the media pore size by adjusting the torque on the yarn-like media support ensemble. This allows for improved filtration and flow control as well. The yarn-like material which is held tightly together against the spool during normal operation of the coalescer/filter is loosened during backwash to allow "strumming" or vibrating to help loosen media-clogging material.

DESCRIPTION OF THE PREFERRED EMBODIMENT

The following describes the invention as a coalescer of oil-in-water suspensions. The invention may, however, also be used for coalescence-separation of other liquid-in-liquid suspensions where solids are a problem.

Figure 1:
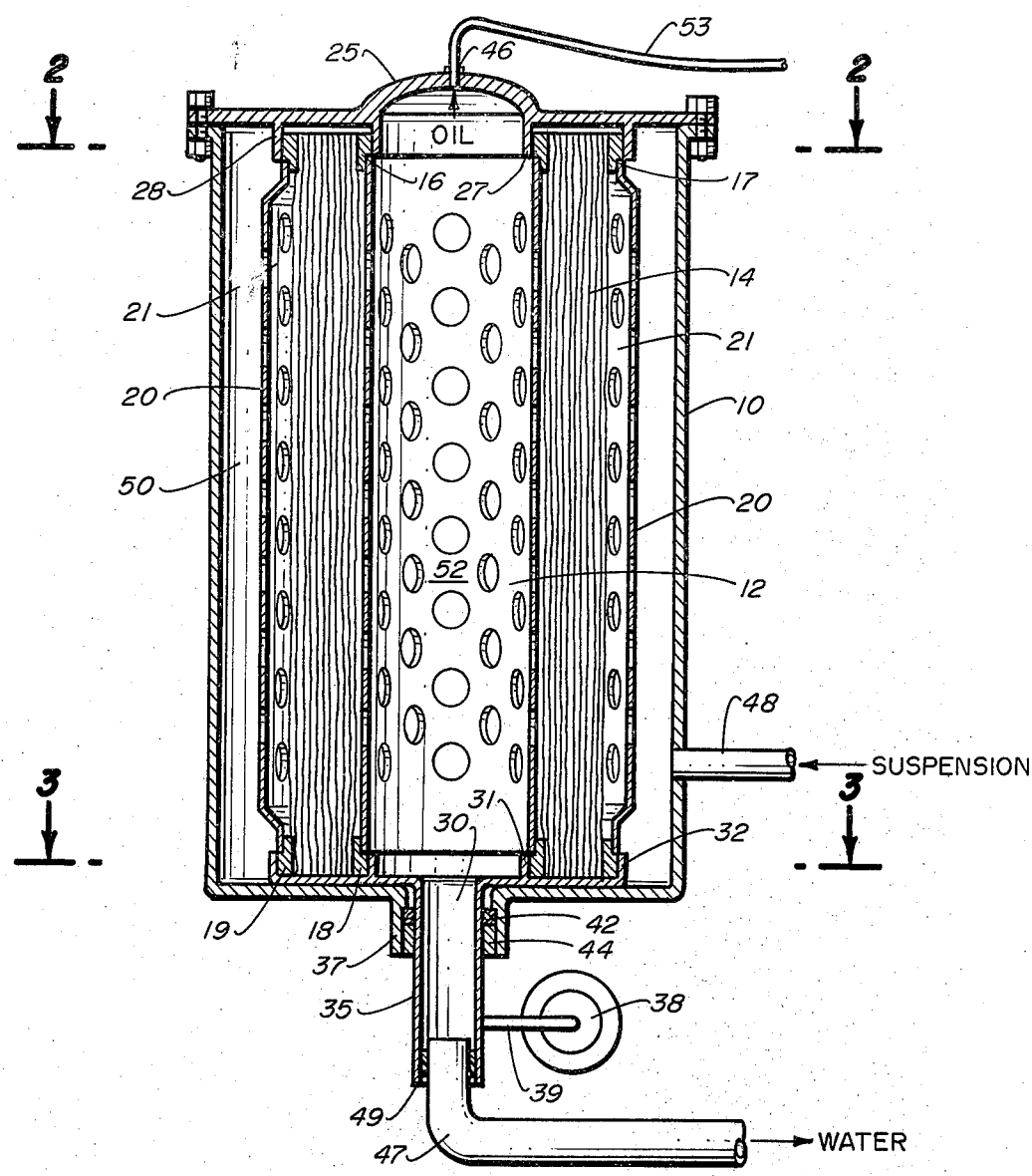
FIG. 1 is a cross-sectional elevational view of a preferred embodiment of the invention.

The invention comprises coalescing apparatus enclosed within a pressure tank 10. A perforated cylinder or tube 12 supports a coalescing yarn-like media 14. Coalescing media 14 comprises a large number of individual strands of yarn or yarn-like material, of equal length, positioned, as shown in FIG. 1 to form a cylindrical-shaped assembly with the yarn-like elements 14 lying substantially in the direction of the cylinder axis. The ends of the yarn-like elements 14 are secured between concentric rings 16 and 17 at the upper end and concentric rings 18 and 19 at the lower end of the pressure tank 10. The concentric rings are made of steel or other suitable material. Inner rings 16 and 18 each have a shoulder on the inside. Outer rings 17 and 19 each have a shoulder on the outside. The shoulders on rings 16 and 18 serve to position the ends of the media at either end of perforated tube 12, and the shoulders on rings 17 and 19 serve to position concentric perforated tube 20 about the outside of the yarn-like media 14, as shown. These shoulders which serve to locate the media between concentric perforated tubes 12 and 20 also hold concentric rings 16 and 17 apart from rings 18 and 19 such that a slight tension exists in the yarn-like strands. Outer tube 20 is formed such that a considerable annular space 21 exists between the inside of the tube and media 14 along most of its length. At either end, however tube 20 is constricted to a smaller diameter and rests in the shoulders in the outer rings 17 and 19.

Figure 2:
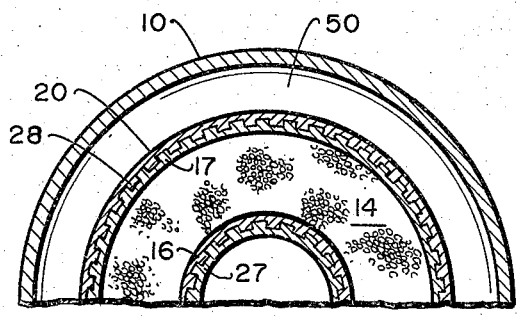
FIG. 2 shows a one-half cross-sectional view taken along section 2—2 of FIG. 1.

This assembly of coalescing media and concentric perforated tubes is mounted within pressure tank 10 having a domed cover 25 bolted thereon, as shown in FIG. 1. Cover 25 has concentric lips 27 and 28 depending from the inner surface thereof. Lips 27 and 28 are keyed or splined to intermesh with inner ring 16 and outer ring 17, respectively, as shown in FIG. 2.

Figure 3:
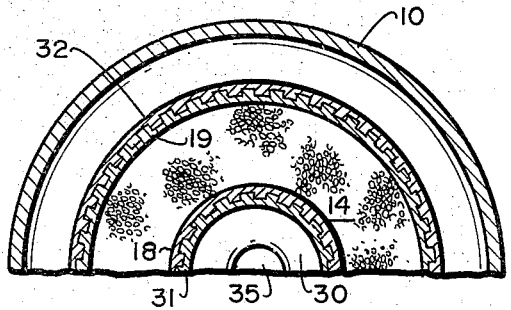
FIG. 3 shows a one-half sectional view taken along section 3—3 of FIG. 1.
Figure 4:
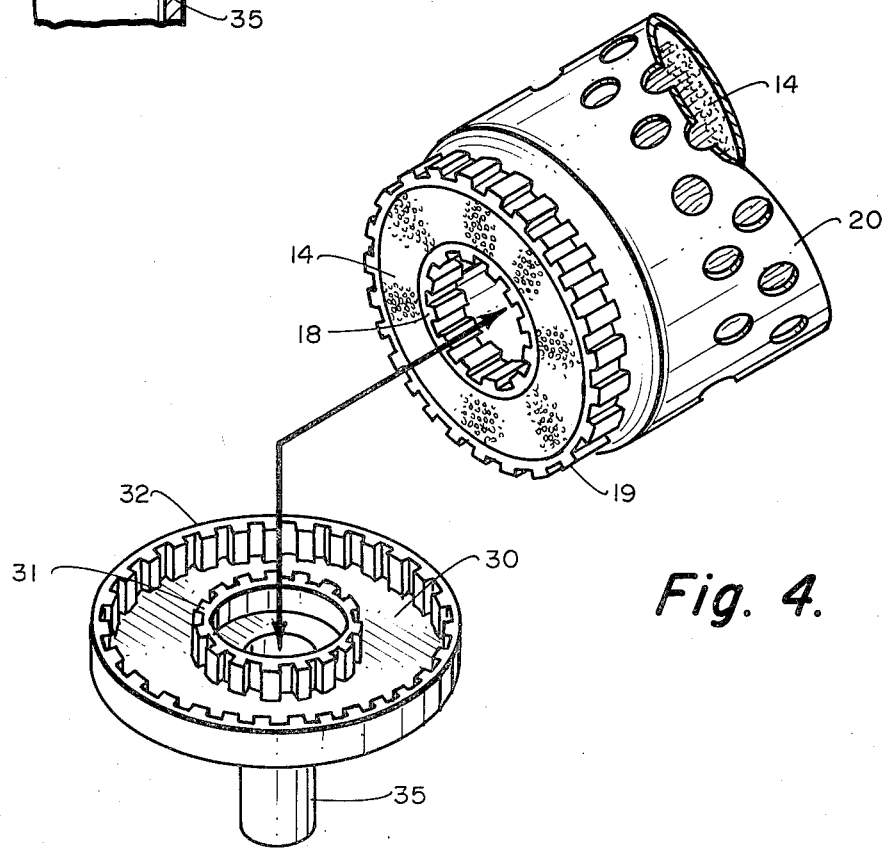
FIG. 4 shows an enlarged detailed exploded view of the control fitting and one end of the media apparatus.

A control fitting 30, at the bottom of tank 10 has inner and outer concentric flanges 31 and 32, which are likewise splined or keyed to interengage with concentric rings 18 and 19, respectively, at the lower end of the coalescing media assembly, as shown in FIGS. 3 and 4.

Figure 5:
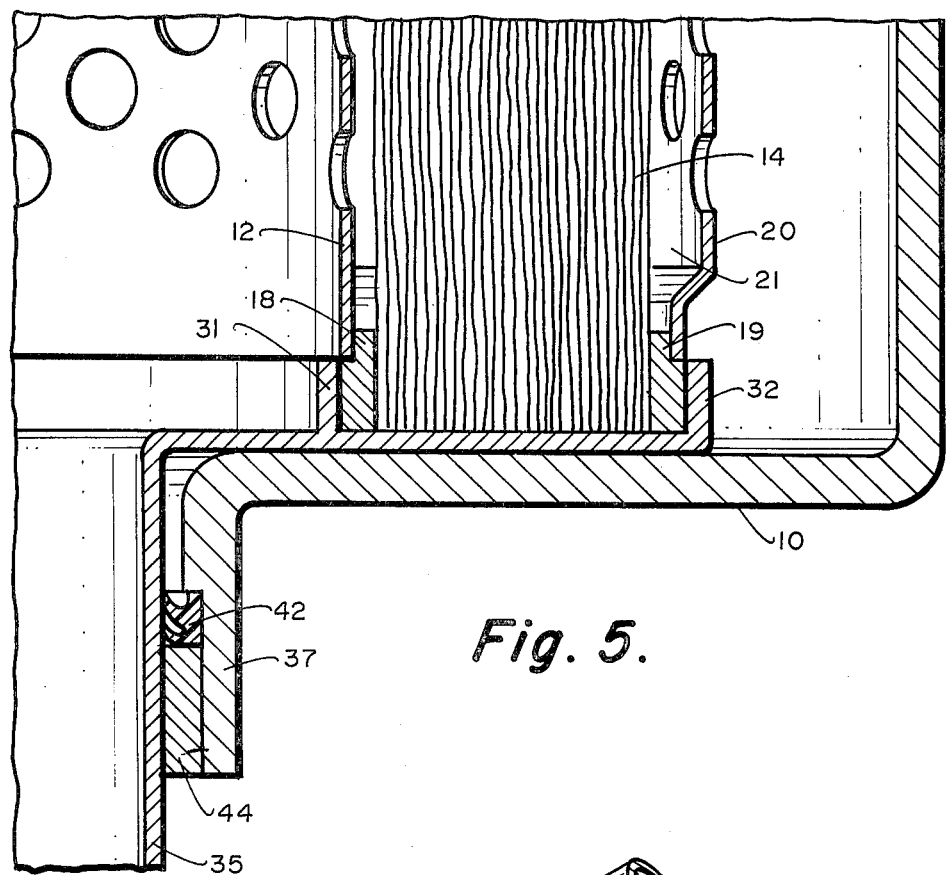
FIG. 5 shows an enlarged detail of the seal and coalescing media concentric rings.

Control fitting 30 has a tubular position 35 which depends downwardly and is sealingly fitted within flanged aperture 37 at the bottom of pressure tank 10, as shown in FIGS. 1 and 5. Control fitting 30 is operable to be rotated within aperture 37 by means of an actuator 38 and arm 39, shown in FIG. 1. Seals 42 held in place by bushing 44 provide a pressure seal between the control fitting tubular portion 35 and flanged aperture 37 of the pressure tank, allowing rotation of the control fitting without leakage of fluid.

Actuator 38 operates to rotate control fitting 30, which in turn rotates concentric rings 18 and 19 as required to wind the yarn-like elements 14 tightly onto inner perforated tube 12 for normal operation by applying a torque to the lower end of the yarn-like media, or for backwash mode by releasing the torsion.

The apparatus has three fluid connections: an oil draw-off connection 46 at the top of domed cover 25; a water draw-off connection 47 at the bottom of control fitting 30; and an inlet connection 48 at the side of tank 10 for introduction of the liquid-in-liquid suspension to be separated. Water draw-off connection 47 fits within tubular portion 35 of control fitting 30 and uses ring seals and bushing at 49 to prevent leakage of fluid while allowing rotation of the control fitting.

In operation, the suspension introduced into tank 10 through inlet 48 fills space 50 and is coalesced by inward flow of the oil-in-water through outer perforated tube 20 and yarn-media 14 while it is tightly helically wound about inner perforated tube 12. Separated oil and water collect in inner chamber 52. Oil is collected in the upper end and clear water in the lower end of chamber 52. After a time when solids and particles have clogged pores in the yarn-like media and reduced performance of the coalescer, control valves (not shown) can be operated to reverse the flows to a backwash mode (outward flows) and actuator 38 operated to move arm 39 and rotate control fitting 30 thereby relieving the torsion on the yarn-like media 14. The strands of the loosened yarn-like media vibrate under the influence of the outward flows and thus are freed from clogging particulate matter which is flushed away in the backwash water. Actuator 38 can be reversed to again helically wind the yarn-like media tightly about perforated tube 12 and the inward flow of oil-in-water suspension commenced to repeat the coalescing filtration cycle.

The dome in cover 25 provides a reservoir for separated oil from the suspension. Oil is conveyed away continuously during the coalescing cycle by a line or hose 53 attached to connection 46 on the cover. Treated, oil-free water is drawn off through outlet connection 47.

Rotatable seals 42-44 and 49 are any sort of bushing and seal arrangement which locates the control fitting and allows it to turn without loss of fluid from tank 10. Annular space 21 formed in perforated tube 20 allows room for the yarn-like media 14 to expand and strum during backwash. Outer circular lip 28 on cover 25 and flange 32 on control fitting 30, which are mated with keys or splines on the outside of the upper and lower outer concentric rings 17 and 19, respectively, operate to reduce the shear stress to which the yarn-like media is subjected as torsion is applied thereto by actuator 38 through control fitting 30. The material of yarn-like media 14 can include all sorts of thread filaments, string, rope, wire, tapes, etc., in addition to yarn and the media pore size can be varied by adjusting the torque on the yarn-like media support ensemble. The invention described herein provides an improvement to filtration as well as coalescing technology. The coalescing media 14 can be held tightly together or loosely together by a twisting action which helically tightens or loosens the yarn-like material to control flow and filter properties.

The apparatus can be operated with outward flows as well as inward flows of suspension liquid. Other embodiments can include angled or horizontal arrangements; rotation of the yarn-like media by other means for helically tightening the media; various ways for collecting separated components, e.g., gravity separation of coalesced oil in an adjacent or remote chamber; and alternate justapositions of inlet, outlet, oil reservoir, etc.

Torsionally adjustable media which can be tightened or loosened to vary pore size in accordance with incoming oil-in-water, etc., properties or the degree of treatment required, together with the use of a media that can be loosened, agitated, and cleansed of particulate matter and then torqued to a tight configuration for normal operation offers conventional coalescer operation with a unique means for cleaning and renewing the coalescer media. (The actuator can be operated from a pressure sensor device, for example.) This apparatus greatly extends the effective operating life-span of the media and allows for extended operation without human attention.

Obviously, many modifications and variations of the present invention are possible in the light of the above teachings. It is therefore to be understood that within the scope of the appended claims the invention may be practiced otherwise than as specifically described.

What is claimed is:

1. Apparatus for coalescing/filtering liquid-in-liquid suspensions (such as oil-in-water) to separate the liquids and remove solid and particulate matter therefrom, comprising:
  a. a hollow porous cylindrical armature;
  b. a coalescing/filtration media composed of a large number of individual strands of yarn-like material formed into a cylindrical-shaped assembly; said yarn-like strands lying substantially in the direction of the axis of the cylindrical-shaped media assembly and being secured together at either of the ends thereof by media fastening means;
  c. said cylindrical-shaped media assembly being positioned about the outer surface of said hollow porous cylindrical armature with the opposite ends thereof held apart to keep said yarn-like strands slightly taut;
  d. a pressure tank for housing said hollow porous cylindrical armature and said cylindrical-shaped media assembly;
  e. means for positioning said hollow porous armature with said cylindrical-shaped media assembly thereabout substantially centrally within said pressure tank and for securing one end of said media assembly from rotation at one end of said pressure tank;
  f. a control fitting positioned at the opposite end of said pressure tank; said control fitting having a tubular outlet passageway depending therefrom which passes out through an annular fitting at said opposite end of said pressure tank; said control fitting operable to be sealingly rotated within said annular fitting;
  g. the opposite end of said cylindrical-shaped media assembly about said armature being secured to said control fitting for rotational movement thereof when said control fitting is rotated;
  h. said hollow porous cylindrical armature forming a central chamber between one end of said pressure tank and said control fitting; said control fitting tubular outlet communicating with one end of said chamber for drawing off a separated liquid; said one end of said pressure tank adjacent said one end of said assembly having a reservoir formed therein; said reservoir having an outlet thereon for drawing off a different separated liquid;
  i. an outer chamber area formed between the outside of said cylindrical-shaped media assembly and about the inner surface of said pressure tank; an inlet means for introduction into said outer chamber of liquid-in-liquid suspension to be separated;
  j. means for rotating said control fitting and thus rotate one end of said cylindrical-shaped media assembly thereby twisting said yarn-like strands helically about said hollow porous cylindrical armature for coalescing and filtering a liquid-in-liquid suspension which is introduced into said pressure tank and which flows from said outer chamber through the coalescing filtration strands of said cylindrical-shaped media assembly and porous armature to said central chamber where the separated liquids can be drawn off at either end of said pressure tank; the degree of helically twisting said yarn-like strands tightly about said porous armature being operable to control the media pore size thereby allowing adjustment of flow control and filtering properties by varying the torque applied to said control fitting;

k. releasing the torque and thus loosening of the yarn-like strands during a backwash mode allowing said yarn-like strands to expand and strum during reverse flow of liquid therethrough for cleaning and removal of solids and particulate matter.

2. Apparatus as in claim 1 wherein the opposite ends of said cylindrical-shaped media assembly are held apart by means of an outer porous tube.

3. Apparatus as in claim 2 wherein said outer porous tube provides an annular space between itself and said yarn-like strands to permit expansion and strumming of said strands during backwash mode of operation.

4. Apparatus as in claim 1 wherein automatic torque actuator means is provided for rotating said control fitting.

5. Apparatus as in claim 1 wherein said yarn-like strands can be formed from any of yarn, thread filaments, wire filaments, rope, tape filaments, and string.

6. Apparatus as in claim 1 wherein said one end of said pressure tank is formed as a removable cover.

7. Apparatus as in claim 6 wherein said reservoir formed at said one end of said pressure tank is formed in said removable cover.

8. Apparatus as in claim 2 wherein said hollow porous cylindrical armature and said outer porous tube are formed from perforated metal cylinders.

9. Apparatus as in claim 1 wherein said media fastening means comprise a pair of concentric metal rings, at either end of the cylindrical-shaped media assembly.

10. Apparatus as in claim 9 wherein shoulders are provided on inner ones of said concentric metal rings to position said porous cylindrical armature.

11. Apparatus as in claim 2 wherein shoulders are provided on outer ones of said concentric metal rings to position said outer porous tube.

12. Apparatus as in claim 1 wherein said opposite end of cylindrical-shaped media assembly is secured to said control fitting by means of splines between said concentric rings and flanges on said control fitting.

13. Apparatus as in claim 6 wherein said means for positioning said hollow porous armature with said cylindrical-shaped media thereabout substantially centrally within said pressure tank and for securing one end of said media assembly from rotation at one end of said pressure tank comprises concentric lips on the inside said removable cover which are splined to intermesh with the concentric rings at one end of said media assembly.

* * * * *